United States Patent [19]

Hostettler

[11] Patent Number: 4,800,040

[45] Date of Patent: * Jan. 24, 1989

[54] LOW TEMPERATURE, STORAGE STABLE MIXTURES OF PREPOLYMERS AND FLOW MODIFIERS

[76] Inventor: Fritz Hostettler, 200 Springhill Rd., Skillman, N.J. 08558

[ * ] Notice: The portion of the term of this patent subsequent to Sep. 4, 2001 has been disclaimed.

[21] Appl. No.: 53,591

[22] Filed: May 20, 1987

Related U.S. Application Data

[63] Continuation of Ser. No. 779,304, Sep. 23, 1985, abandoned, which is a continuation of Ser. No. 508,245, Jun. 27, 1983, abandoned.

[51] Int. Cl.$^4$ .......................... C09K 3/00; H05B 33/00
[52] U.S. Cl. .................................. 252/182.2; 521/114; 521/115; 521/159; 521/160; 528/48; 528/52; 528/67; 524/775; 560/26
[58] Field of Search .......................................... 252/182

[56] References Cited

U.S. PATENT DOCUMENTS

| | | | |
|---|---|---|---|
| 3,644,457 | 2/1972 | Konig et al. | 521/195 |
| 3,666,724 | 5/1972 | Hostettler | 521/172 |
| 3,956,221 | 5/1976 | Olstowski et al. | 524/759 |
| 3,957,753 | 5/1976 | Hostettler et al. | 521/172 |
| 3,965,073 | 6/1976 | Olstowski et al. | 528/48 |
| 4,000,105 | 12/1976 | Olstowski et al. | 524/772 |
| 4,076,660 | 2/1978 | Olstowski et al. | 524/764 |
| 4,115,429 | 9/1978 | Reiff et al. | 521/159 |
| 4,118,411 | 10/1978 | Reiff et al. | 260/453 AM |
| 4,287,307 | 9/1981 | Hostettler | 521/51 |
| 4,469,616 | 9/1984 | Hostettler | 252/182 |

Primary Examiner—A. Lionel Clingman

[57] ABSTRACT

There are provided low temperature, storage stable, liquid mixtures of (1) isocyanato-containing prepolymers obtained from the reaction of linear and/or slightly branched polyols and a polyisocyanate characterized by a methylene group —$CH_2$— bonded to two benzenoid nuclei, and (2) a non-hydroxyl-containing flow modifier which is compatible with the said prepolymer. Novel liquid mixtures thus prepared exhibit little tendency to crystallize or phase separate when stored for prolonged periods of time, i.e., well below room temperature for several days.

19 Claims, No Drawings

LOW TEMPERATURE, STORAGE STABLE MIXTURES OF PREPOLYMERS AND FLOW MODIFIERS

This application is a continuation of Ser. No. 779,304 filed Sept. 23, 1985 and abandoned and which is a continuation of application Ser. No. 508,245 filed June 27, 1983.

BACKGROUND OF THE INVENTION

It is well recognized that polyisocyanates which are liquid at room temperature have obvious processing advantages over solid polyisocyanates; see for instance U.S. Pat. No. 4,115,429. Polysicoyanates such as the commercially available and widely used toluene diisocyanate (TDI) and 1,6-hexamethylene diisocyanate are potentially harmful due to their relatively high vapor pressure and accordingly, certain safety precautions are employed to minimize harmful physiological effects. For this reason, various attempts have been made, either to start with diisocyanates that are normally liquid at room temperature and to reduce their physiological effects by certain procedures or to start with diisocyanates that are solid at room temperature and to convert these into liquid form. In both cases, however, one usually obtains either isocyanates of higher valency, i.e., tri- or higher polyisocyanates or higher molecular weight diisocyanates or a combination of these effects.

Important diisocyanates which are solid at room temperature and which are readily available on a large commercial scale are 4,4'-diphenylmethane diisocyanate and the 2,4'-isomer thereof which melt at 39° C. and 34.5° C., respectively. Attempts have already been made to liquefy both the 4,4'-diphenylmethane diisocyanate and a mixture of the 4,4'-diphenylmethane diisocyanate and a small amount of the 2,4'-isomer. Thus, for example in U.S. Pat. No. 3,644,457, 1 mol of a diphenylmethane diisocyanate is reacted with from about 0.1 to about 0.3 mol of poly-1,2-propylene ether glycol. While the products made according to this patent have met with commercial success, they still suffer from a serious drawback. Specifically, it has been found that these adducts generally will crystallize anywhere from 5° C. to as high as 25° C. In fact, when supplied in commercial quantities, these adducts are generally transported in heated trucks. Additionally, in order to thaw the materials it is generally necessary to heat them to somewhere in excess of 50° to 60° C. While in warmer climates there may not be any problem, in colder areas where the product may be stored in tanks over a period of time, this tendency to crystallize can become a very serious problem. Similar attempts to form liquid diphenylmethane diisocyanates have been described, for example, in U.S. Pat. Nos. 3,384,653 and 3,394,164. The attempts to liquefy in both of these instances were based on the addition of, in one case, a trihydrocarbyl phosphate, and, in the other case, small amount of phosphoric acid. In any event, the storage stability of both of these types of products is again quite good around room temperature, but as the temperature decreases, both types of materials tend to crystallize.

Isocyanato-terminated prepolymers of about 600 to about 4500 molecular weight, e.g., prepared from the reaction of an excess of 4,4'-diphenylmethane diisocyanate (MDI) with (i) linear or slightly branched polyesterdiols with/without polyestertriols (reaction products of lower aliphatic glycols with/without small amounts of glycerol and alkanedicarboxylic acids), or (ii) dipropylene glycol, comprise products generally having melting points of about 10° C. to about 30° C., and higher, depending primarily on the amount and structure of the polyol employed. Quasi-prepolymers containing, by weight, from about 50% to about 60% of the polyol segment (e.g., a polyol from adipic acid, ethylene glycol, 1,4-butandiol) are generally liquid products at room temperature. When the MDI content is increased to about 60%, or more, the resulting quasi-prepolymers are oftentimes crystalline products in the 15°–25° C. range. Quasi-prepolymers comprised of MDI and about 10–15% of the di- and/or tripropylene glycol(s) are oftentimes crystalline at about 15° C. -20° C. In this state, the quasi-prepolymers are more difficult to process, exhibit greater tendency towards dimerization and trimerization reactions, and detract from optimal physical characteristics of the end polyurethane product.

SUMMARY OF THE INVENTION

It has now been found quite unexpectedly indeed that there can be prepared novel low temperature, storage stable, liquid mixtures of (1) isocyanato-containing prepolymers derived from the reaction of (i) a polyol and (ii) an organic polyisocyanate characterized by a methylene group bonded to two benzene nuclei as, for example, 4,4'-diphenylmethane diisocyanate, and (2) a non-hydroxyl-containing flow modifier, hereinafter developed in detail. The non-hydroxyl flow modifier is a normally-liquid compound and compatible with the prepolymer, or it may be a low melting solid which forms a normally-liquid, compatible mixture with the prepolymer. The addition of a few parts (by weight), e.g., about 3 parts of flow modifier to 100 parts (by weight) of prepolymer can result in compatible mixtures whose melting points are measurably lower than the prepolymer per se. In general, a practical commercial lower limit is approximately 5 parts flow modifier per 100 parts prepolymer. Thus, in the practice of the invention, there can be prepared novel liquid compatible mixtures comprising prepolymer(s) and flow modifier(s) which exhibit storage stability for long periods of time at temperatures substantially below room temperature, for example, at about +5° C., and lower, for several days to several weeks, e.g., at least 100 hours, and longer. Many of the novel liquid mixtures exhibited compatibility, did not crystallize or phase separate, and remained chemically stable for at least one week (and upwards to several weeks) at temperatures at about 0° C., and lower. During these periods several of the novel mixtures were liquid, compatible, non-crystalline, and chemically stable at −5° C., and −10° C., and even below these temperatures. Thus, the novel mixtures can be transported over great distances and stored for prolonged periods of time at low temperature, and remain in a compatible liquid state ready for the intended use. Handling and processing problems which are associated with polyisocyanate compounds crystallizing or melting in the 15° C. to 30° C. and higher range are substantially eliminated by using the novel mixtures described herein. Moreover, it has been observed that dimerization and trimerization reactions are greatly reduced. The novel storage stable liquid mixtures are readily cast or metered through pumps, and have very low vapor pressure and therefore are substantially physiologically harmless.

The novel liquid mixtures comprising prepolymer and non-hydroxyl flow modifier can be employed in the NCO/OH polyaddition reactions to prepare a wide variety of polyurethane products such as coatings, adhesives, foams, and elastomers. These novel mixtures have been found to be extremely useful and, indeed highly preferred for the preparation of homogeneous and cellular polyurethane products, especially microcellular products such as, for example, integral skin microcellular polyurethanes. Such products exhibit a broad spectrum of highly desirable and/or improved characteristics.

DETAILED DESCRIPTION OF THE INVENTION

It has now been found that a wide variety of non-hydroxyl-containing flow modifiers can be admixed with the prepolymers to form novel low temperature, storage stable, liquid mixtures. The flow modifier and prepolymer are compatible and soluble with each other forming a solution which does not phase separate for long periods of time at low temperatures. The flow modifier has a boiling point above about 150° C. and is normally-liquid, i.e., liquid at about 20° C., or is a relatively low melting solid which forms with the prepolymer a compatible, storage stable, low temperature liquid mixture. The flow modifier is composed of (i) carbon and hydrogen atoms preferably in the form of a monovalent hydrocarbon group(s) or monovalent and polyvalent hydrocarbon group(s) such as a $C_1$–$C_{18}$acyclic group, a $C_5$–$C_7$-cycloaliphatic group including unsubstituted- and mono and poly $C_1$–$C_4$alkyl substituted-$C_5$–$C_7$cycloalkyl, and/or a benzenoid ring nucleus, e.g., mono-, fused-, and bridged nuclei, including the partially or fully hydrogenated ring nuclei and the unsubstituted- and mono and poly $C_1$–$C_4$alkyl substituted-counterparts thereof; and (b) oxygen in the form of 1 to 3 ester

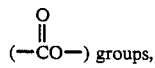
(—CO—) groups, preferably 2 ester groups. Illustrative flow modifiers include the monoester and polyesters of mono- and polyhydric and phenolic compounds (hydroxyl compound(s) for convenience) with mono- and polycarboxylic acids, for example, the diester of a monohydroxyl compound and a dicarboxylic acid, the triester of a monohydroxyl compound and a tricarboxylic acid, the diester of a dihydroxyl compound and a monocarboxylic acid, the triester of a trihydroxyl compound and a monocarboxylic acid, the monoester of a monohydroxyl compound and a monocarboxylic acid, and obvious mixtures thereof.

The average molecular weight of the flow modifiers which are employed in the preparation of the novel storage stable, liquid mixtures can vary over a wide range depending on the prepolymer component and the flow modifier of choice. Thus, the molecular weight can range from about 100 to approximately 1000, providing that the flow modifier satisfies the requirements stated previously, i.e., normally liquid material (or a low melting solid) which is compatible and soluble with the prepolymer, does not contain groups as illustrated below which are reactive with isocyanato groups under typical storage and shipping temperatures, etc. In general, however, many flow modifiers suitable in the practice of the invention have molecular weights in the range of from about 135 to about 800, desirably from about 150 to about 600. The flow modifiers are characterized by the absence of groups which are normally reactive with an isocyanato group (—NCO) at typical storage and shipping temperatures such as hydroxyl, carboxyl, thiol, primary amino, secondary amino, and the like.

Various subclasses of flow modifiers which are suitable in the practice of the invention(s) are represented by the structural formulas infra. A preferred subclass is shown below as formula (I):

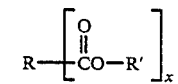

wherein each R', individually, represents a monovalent $C_1$–$C_{18}$acyclic or a $C_5$–$C_7$alicyclic or an aryl hydrocarbon group such as $C_2$–$C_{12}$alkenyl, $C_1$–$C_{18}$alkyl, a $C_5$–$C_7$cycloalkyl or $C_5$–$C_7$cycloalkenyl which may contain $C_1$–$C_4$alkyl substituents thereon, for example, methyl, ethyl, butyl, hexyl, octyl, isooctyl, lauryl, stearyl, allyl, hexenyl, oleyl, cyclohexyl, cyclopentyl, cyclohexenyl, cyclohexylmethyl, methylcyclohexyl, phenethyl, benzyl, phenylpropyl, $C_1$–$C_4$alkylphenyl, phenyl, biphenylyl, and xylyl; wherein x is an integer having a value of 1 to 3, preferably 2; and wherein R represents a mono- or polyvalent hydrocarbon group, its valence depending on the value of x. Illustrative R groups include acyclic, alicyclic and aromatic hydrocarbon groups having up to 17 carbon atoms such as $C_4$–$C_{17}$alkyl; $C_4$–$C_{17}$alkenyl; $C_2$–$C_{12}$alkylene; $C_2$–$C_{12}$alkenylene; unsubstituted- and $C_1$–$C_4$alkyl substituted-$C_5$–$C_7$cycloalkyl, $C_5$–$C_7$cycloalkenyl, $C_5$–$C_7$cycloalkylene, or $C_5$–$C_7$cycloalkenylene; mono-, di-, and trivalent benzene including mono, fused, and bridged and the partially and fully hydrogenated counterparts thereof; for example, butyl, hexyl, octyl, dodecyl, oleyl, stearyl, lauryl, ethylene, propylene, trimethylene, tetramethylene, 1,5-pentylene, 1,6-hexylene, 1,7-heptylene, 1,8-octylene, 1,10-decylene, octanetriyl, cyclohexyl, cyclohexylene, phenethyl, benzyl, phenyl, $C_1$–$C_4$alkylphenyl, $C_1$–$C_4$alkylphenylene, phenylene, benzenetriyl, naphthylene, and the like. The di($C_1$–$C_{12}$alkyl) $C_4$–$C_{10}$alkanedioates and di($C_1$–$C_{12}$alkyl) phthalates are preferred.

Another subclass of flow modifiers useful in the practice of the invention is represented by Formula II infra:

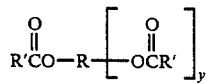

wherein y is an integer having a value of 1–2; wherein each R', individually, has the meanings assigned to R' in Formula I supra; wherein R is a divalent or trivalent hydrocarbon group, its valence depending on the value of x, and has the meanings assigned to polyvalent R of Formula I supra; and wherein each

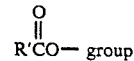
R'CO— group of Formula II is monovalently bonded to separate carbon atoms of the R variable.

Flow modifiers suitable in the practice of the invention include the diesters and triesters of $C_2$-$C_{17}$alkanoic acid or benzoic acid with $C_2$-$C_8$alkanediols or $C_3$-$C_6$alkanetroils.

Specific flow modifiers can be illustrated by dibutyl phthalate, dibutyl terephthalate, diisooctyl phthalate, di-n-octyl terephthalate, diisobutyl adipate, di(2-ethylhexyl) adipate, di(2-ethylhexyl) glutarate, dibutyl sebacate, dihexyl sebacate, dimethyl phthalate, butyl octanoate, the triester of glycerol and butyric acid, the diester of 1,4-butanediol and hexanoic acid, and the like.

The prepolymer component of the novel low temperature, storage stable, liquid mixtures comprises the reaction product(s) of a diphenylmethane diisocyanate with linear and/or slightly branched chain polyesterpolyols or polyetherpolyols. Suitable polyesterpolyols are those having hydroxyl equivalent weights in the range of from about 400 to about 2250, although polyesterpolyols outside this range can be used to produce useful urethane products. Useful polyetherpolyols fall in a somewhat broader hydroxyl equivalent weight range, e.g., from about 60 to about 2250. However, novel liquid mixtures comprising quasi-prepolymers from a diphenylmethane diisocyanate and (a) a polyesterdiol, and optionally, a small amount of higher polyesterpolyol(s) having hydroxyl equivalent weights between about 500 to about 2000, or (b) a polyetherdiol, and optionally, a small amount of higher polyetherpolyol(s) having hydroxyl equivalent weights between about 200 to about 2000, are most desirable in the manufacture of high performance microcellular urethane elastomers including integral skin microcellular urethane products. For instance, integral skin microcellular urethane articles, e.g., shoe soles, can be obtained which are characterized by a resilient core of substantially uniform density and an integrally formed, tough, substantially continuous surface skin surrounding said core, the boundary between said skin and said core being characterized by a rather abrupt change in density. The skin is itself flexible, essentially devoid of blemishes, impervious to oil and water, directly accepts paint without first requiring primers to its surface, and exhibits superior flex life, high tear strength, and generally superior abrasion resistance.

In the practice of preferred embodiments of the invention, there can be achieved liquid, compatible, low temperature, long-standing, storage stable solutions comprising prepolymer and flow modifier and outstanding urethane products therefrom, e.g., molded microcellular integral skin shoe soles, by utilizing prepolymers derived from a diphenylmethane diisocyanate and linear polyesterdiols or polyetherdiols and/or slightly branched higher polyesterpolyols or polyetherpolyols which have hydroxyl equivalent weight in the range of from about 500 to about 1500, preferably from about 750 to about 1250. In general, the functionality (OH) of the polyesterpolyol or the polyetherpolyol is in the range of from 2 to about 3, desirably 2 to about 2.5, preferably 2 to about 2.2, and most preferably 2 to about 2.1.

The linear and/or branched polyesterpolyols may be prepared by processes which are well known in the prior art. For example, the polyesterpolyols may be manufactured by polyesterification of polycarboxylic acids, hydroxycarboxylic acids including lower oligomers thereof, or lactones with glycols or higher polyols, including mixtures of the foregoing, generally in the presence of a suitable catalyst and at an elevated temperature. The polyesterpolyols derived from epsilon-caprolactones and other monomers are adequately described in U.S. Pat. No. 3,169,945 and generally comprises the reaction of one or more lactones with one or more polyols. Additional polyesterpolyols are described in U.S. Pat. Nos. 3,666,724 and 3,957,753. The disclosure of the foregoing patents are incorporated into this disclosure to the extent necessary to illustrate the scope of the invention.

Other polyesterpolyols, as indicated previously, are derived from the esterification reaction of at least one polycarboxylic acid with at least one polyol. Illustrative polycarboxylic acids include succinic acid, glutaric acid, adipic acid, pimelic acid, suberic acid, azelaic acid, and the like. Anhydrides of the acids can also be used. Illustrative polyhydric compounds include the aliphatic glycols such as ethylene glycol, diethylene glycol, 1,3-propanediol, 1,4-butanediol, 1,5-pentanediol, 1,6-hexanediol, 1,10-hexanediol, neopentylene glycol, dipropylene glycol, and others. Examples of other polyhydric compounds include the trihydric alcohols such as glycerol, 1,1,1-trimethylolethane, 1,1,1-trimethylolpropane, and 1,2,6-hexanetriol; pentaerylthritol; sorbitol; and the like. The $C_4$-$C_{10}$alkanedioic acids are preferred, in particular, glutaric acid and adipic acid, whereas the saturated $C_2$-$C_6$aliphatic diols are most suitable.

The linear and branched chain polyetherpolyols can be prepared by processes well documented in the art as by reacting a hydroxylated functional compound such as $C_2$-$C_{10}$alkanediols, $C_3$-$C_{10}$alkanetriols, tetrols, etc., e.g., ethylene glycol, 1,4-butanediol, 1,2-propanediol, glycerol, trimethylolpropane, trimethylolethane, $H_2O$, and others, with an epoxide compound, preferably a vicinal epoxide characterized by the

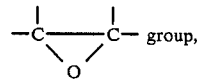 group, e.g., ethylene oxide, propylene oxide, 1,2-butylene oxide, 2,3-butylene oxide, styrene oxide, epichlorohydrin, 1,2-epoxycyclohexane, tetrahydrofuran, mixtures thereof, and the like. Preferred epoxides are propylene oxide, ethylene oxide, mixtures thereof with/without minor amounts of other epoxide compounds. Particularly preferred polyetherpolyols are characterized by oxypropylene units, oxypropyleneoxyethylene units, with/without partial capping of the polyetherpolyol with ethylene oxide to enhance the primary hydroxyl termination of the polyetherpolyol.

The polyisocyanate compound used in the preparation of the isocyanato-terminated prepolymer is characterized by a methylene group (—$CH_2$—), each valence of which is separately bonded to a carbon atom of a benzenoid nucleus such as a diphenylmethane diisocyanate (MDI), for example, 4,4'-diphenylmethane diisocyanate, 2,4'-diphenylmethane diisocyanate, mixtures of 4,4'-MDI and 2,4'-MDI, a liquid mixture of 4,4'-MDI and carbodiimides thereof, e.g., Isonate 143-L, mixtures of 4,4'-MDI and minor amount of the 2,4'- and 2,2'-MDI isomers, and the like. Desirably, the diisocyanate compound contains at least 75 wt. %, preferably at least 90 wt. % 4,4'-MDI, and a minor amount other MDI isomers or carbodiimides illustrated above or mixture thereof and the like. The isocyanate compound and polyol are reacted in a ratio of NCO groups to OH group of at lest about 2.5:1, but a more suitable range of NCO equivalents per OH equivalent is from about 2.7 to about 24 (NCO) to one (OH). A NCO/OH ratio in the range of from about 3.7:1 to about 12:1 is preferred with a most preferred ratio being from about 7 to about 12 NCO equivalents per one OH equivalent. The addition of the flow modifiers of the invention to the prepolymers not only improves the low temperature stability of these prepolymers but very unexpectedly and surprisingly, indeed, also improves their chemical stability. It has been observed that the tendency towards the formation of insoluble isocyanate trimers and dimers under ambient storage conditions of from about 10° C.-30° C. is markedly reduced. Various mixtures of flow modifier and prepolymer have been observed to be clear after several months indicating a total absence of dimer and trimer formation.

A few parts, e.g., 2-3 parts, of flow modifier added to 100 parts of prepolymer can result in a compatible solution whose melting point is measurably lower than the prepolymer per se. In general, it is desirable to incorporate at least about 5 parts (by weight) of flow modifier into 100 parts (by weight) of prepolymer. Though in some instances 35 parts, and even more, of flow modifier per 100 parts of prepolymer can be admixed together to form low temperature, storage stable, compatible solutions, it is desirable to employ about 5 to about 30 parts, preferably from about 7 to about 25 parts, and preferably still from about 7 to about 20 parts, of flow modifier per 100 parts of prepolymer. The optimum commercial range will, to a large degree, depend on the choice of the flow modifier and prepolymer. One or more flow modifiers can be employed in the practice of the invention providing the resulting novel mixture is a normally-liquid, compatible mixture. Additional ingredients which do not contain hydrogen active with isocyanato groups, e.g., surfactant, blowing agent, dye, can be incorporated into the novel mixture; however, from a commercial standpoint such ingredients are generally included with the polyol component.

Inasmuch as a number of components employed in the practice of the invention have been identified by their trade names, for the sake of convenience, these are tabulated herein and their chemical structure or specifications further amplified so that any of these components can be readily obtainable or made by those of ordinary skill in the art. The components are marked with an asterisk (*) in the Examples.

| TRADE NAME DESIGNATION TABLE | |
|---|---|
| Trade Designation | Identification of Component(s) and source of same |
| ISONATE 240 Isocyanate | The Upjohn Company. A prepolymer comprising the reaction product of about 40 parts by weight of (a) a difunctional copolyester polyol of adipic acid, ethylene glycol and 1,4-butanediol having a molecular weight of about 2000, and (b) about 60 parts by weight of carbodiimide modified 4,4'-diphenylmethane diisocyanate; said prepolymer having an isocyanate content of about 18.8% by weight, an isocyanate equivalent of about 223, and a viscosity at 30° C. of about 1000 centipoises. |

| -continued | |
|---|---|
| TRADE NAME DESIGNATION TABLE | |
| Trade Designation | Identification of Component(s) and source of same |
| | The product crystallizes below 15° C.. |
| ISONATE PF Isocyanate | Mobay Chemical Corporation Polyurethane Division A clear yellow liquid isocyanato-terminated polyether prepolymer made by reacting about 85 weight percent diphenylmethane diisocyanate and 15 weight percent dipropylene glycol and tripropylene glycol. It has an isocyanate content of about 22.6% by weight and an isocyanate equivalent of about 186. |
| MONDUR E-501 Isocyanate | Mobay Chemical Corporation Polyurethane Division A carbodiimide modified diphenylmethane diisocyanate terminated polyester prepolymer having an isocyanate content of about 18.9% by weight, an isocyanate equivalent of about 222.5, and a viscosity at 30° C. of about 830 centipoises. Similar to Isonate 240, contains slightly more carbodiimide. |

The following examples are illustrative of the invention but are not to be construed as to limiting the scope thereof in any manner.

EXAMPLES 1–37

Various flow modifiers were examined for compatibility with various (isocyanato-terminated prepolymers). Each flow modifier was tested at three concentrations by weight (90 parts isocyanate/10 parts flow modifier, 80 parts isocyanate/20 parts flow modifier and 70 parts isocyanate/30 parts flow modifier). The flow modifiers were predried using molecular sieves, Type 4A, from the Linde Division of Union Carbide Corporation. Karl Fischer tests (ASTM D-2849) for % H$_2$O show no detectable levels of water. The samples were prepared by weighting into a test tube the following:

| | 90/10 | 80/20 | 70/30 |
|---|---|---|---|
| Flow Modifier (gms) | 1.5 | 3.0 | 4.5 |
| Isocyanate (gms) | 13.5 | 12.0 | 10.5 |

The test tubes were tightly capped and heated to 70° C. for 20-30 minutes. The samples were agitated by vigorous shaking while hot and observations with respect to miscibility at this temperature (70° C.) were made. The samples were cooled in a constant temperature bath to 25° C. for 4-6 hours and the observations at 25° C. were then made. Compatibile mixtures were then further cooled in a constant temperature bath to 20° C., 15° C., 10° C., 5° C., 0° C., −5° C., and −10° C., respectively, and allowed to remain at each temperature for a minimum of 24 hours. Observations regarding separation, cloud point (the temperature when haze is first observed), and freezing point (the temperature when crystals are first observed) were made at each temperature interval. Fifteen gram samples of the prepolymers were tested as controls. Some mixtures at 25° C. were subjected to further treatment as indicated in the footnotes of Table I. Mixtures which reacted or separated were not further tested. The date are set forth in Table I supra.

TABLE I

| NO. | FLOW MODIFIER | CONCENTRATION BY WEIGHT | IN MONDUR E-501* COMPATIBILITY @ 70° C. | COMPATIBILITY @ 25° C. | SEPARATION POINT | CLOUD POINT | FREEZE POINT | IN ISONATE 240* COMPATIBILITY @ 70° C. | COMPATIBILITY @ 25° C. | SEPARATION POINT | CLOUD POINT | FREEZE POINT |
|---|---|---|---|---|---|---|---|---|---|---|---|---|
| 1. | Bis(2-Ethylhexyl) Terephthalate | 10% | YES | YES$^{(1)}$ | — | N.N.$^{(5)}$ | −5° C. | YES | YES$^{(1)}$ | — | −0° C. | −5° C. |
|  |  | 20% | YES | YES$^{(1)}$ | >25° C. | — | — | YES | SEP$^{(1)}$ | >25° C. | — | — |
|  |  | 30% | YES | YES$^{(1)}$ | >25° C. | −5° C. | −5° C. | SEP. | —$^{(1)}$ | >70° C. | — | — |
| 2. | Diisodecyl Phthalate | 10% | YES | YES$^{(1)}$ | — | 20° C. | — | YES | YES$^{(1)}$ | — | 20° C. | −5° C. |
|  |  | 20% | YES | YES$^{(1)}$ | 5° C. | 20° C. | N.T.$^{(6)}$ | SEP | SEP$^{(1,3,4)}$ | >25° C. | — | N.T.$^{(6)}$ |
|  |  | 30% | YES | SEP$^{(1)}$ | >25° C. | — | — | SEP | SEP$^{(1,3,4)}$ | >70° C. | — | N.T.$^{(6)}$ |
| 3. | Dibutyl Phthalate | 10% | YES | YES$^{(1)}$ | — | 0° C. | −5° C. | YES | YES$^{(1)}$ | — | 0° C. | −5° C. |
|  |  | 20% | YES | YES$^{(1)}$ | — | <−10° C. | <−10° C. | YES | YES$^{(1)}$ | — | −10° C. | <−10° C. |
|  |  | 30% | YES | YES$^{(1)}$ | — | <−10° C. | <−10° C. | YES | YES$^{(1)}$ | — | <−10° C. | <−10° C. |
| 4. | Trioctyl Trimellitate | 10% | YES | YES$^{(1)}$ | >25° C. | 15° C. | 0° C. | SL. HAZE$^{(1)}$ | SL. HAZE$^{(1)}$ | 20° C. | — | N.T.$^{(6)}$ |
|  |  | 20% | YES | SEP$^{(1)}$ | >25° C. | >70° C. | — | SEP | —$^{(1)}$ | >70° C. | — | N.T.$^{(6)}$ |
|  |  | 30% | HAZY | SEP$^{(1)}$ | — | N.N.$^{(5)}$ | — | SEP | —$^{(1)}$ | >70° C. | — | N.T.$^{(6)}$ |
| 5. | Diisodecyl Phthalate | 10% | YES | YES$^{(1)}$ | — | 5° C. | −5° C. | YES | YES$^{(1)}$ | — | 0° C. | −5° C. |
|  |  | 20% | YES | YES$^{(1)}$ | — | 10° C. | <−10° C. | YES | YES$^{(1)}$ | — | 0° C. | N.T.$^{(6)}$ |
|  |  | 30% | YES | YES$^{(1)}$ | −5° C. | 5° C. | N.T.$^{(6)}$ | YES | YES$^{(1,4)}$ | >25° C. | — | N.T.$^{(6)}$ |
| 6. | Dioctyl Sebacate | 10% | YES | YES$^{(1)}$ | — | — | N.T.$^{(6)}$ | YES | HAZY$^{(1)}$ | — | >25° C. | N.T.$^{(6)}$ |
|  |  | 20% | SEP | —$^{(1)}$ | >70° C. | <−10° C. | N.T.$^{(6)}$ | SEP | SEP$^{(1)}$ | >70° C. | — | N.T.$^{(6)}$ |
|  |  | 30% | SEP | —$^{(1)}$ | >70° C. | <−10° C. | N.T.$^{(6)}$ | SEP | SEP$^{(1)}$ | >25° C. | — | N.T.$^{(6)}$ |
| 7. | Ditridecyl Phthalate | 10% | YES | SEP$^{(1)}$ | >25° C. | 20° C. | −5° C. | SEP | SEP$^{(1)}$ | >70° C. | — | N.T.$^{(6)}$ |
|  |  | 20% | SEP | SEP$^{(1)}$ | >25° C. | 5° C. | −10° C. | SEP | SEP$^{(1)}$ | >25° C. | 10° C. | −5° C. |
|  |  | 30% | SEP | —$^{(1)}$ | — | −5° C. | <−10° C. | SEP | —$^{(1)}$ | >25° C. | 10° C. | <−10° C. |
| 8. | Diallyl Phthalate | 10% | YES | YES$^{(1)}$ | — | −10° C. | −10° C. | YES | YES$^{(1)}$ | — | 20° C. | <−10° C. |
|  |  | 20% | YES | YES$^{(1,2)}$ | — | 10° C. | −5° C. | YES | YES$^{(1)}$ | — | <−10° C. | <−10° C. |
|  |  | 30% | YES | YES$^{(1,2)}$ | — | <−10° C. | <−10° C. | YES | YES$^{(1)}$ | — | −5° C. | −5° C. |
| 9. | Diisobutyl Adipate | 10% | YES | YES$^{(1)}$ | — | 0° C. | −5° C. | YES | YES$^{(1)}$ | — | <−10° C. | <−10° C. |
|  |  | 20% | YES | YES$^{(1)}$ | — | <−10° C. | <−10° C. | YES | YES$^{(1)}$ | — | <−10° C. | <−10° C. |
|  |  | 30% | YES | YES$^{(1)}$ | — | 0° C. | −5° C. | YES | YES$^{(1)}$ | — | 0° C. | −5° C. |
| 10. | Dibutyl Sebacate | 10% | YES | YES$^{(1)}$ | — | 20° C. | −5° C. | YES | YES$^{(1)}$ | — | 0° C. | −5° C. |
|  |  | 20% | YES | YES$^{(1)}$ | — | >20° C. | N.T.$^{(6)}$ | YES | YES$^{(1)}$ | — | 5° C. | −5° C. |
|  |  | 30% | YES | YES$^{(1)}$ | — | 15° C. | N.T.$^{(6)}$ | YES | YES$^{(1)}$ | — | 10° C. | −10° C. |
| 11. | Dioctyl Azelate | 10% | YES | SEP$^{(1)}$ | >25° C. | >25° C. | N.T.$^{(6)}$ | SEP | SEP$^{(1)}$ | 0° C. | — | N.T.$^{(6)}$ |
|  |  | 20% | YES | SEP$^{(1)}$ | >25° C. | >70° C. | N.T.$^{(6)}$ | SEP | —$^{(1)}$ | >70° C. | — | N.T.$^{(6)}$ |
|  |  | 30% | HAZY | SEP$^{(1)}$ | — | N.N.$^{(5)}$ | N.T.$^{(6)}$ | VERY SL. HAZE | VERY SL. HAZE$^{(1)}$ | 0° C. | >70° C. | 0° C. |
| 12. | n-Octyl-n-Decyl Adipate | 10% | YES | YES$^{(1)}$ | — | — | 0° C. | HAZY | SEP$^{(1)}$ | 0° C. | >70° C. | N.T.$^{(6)}$ |
|  |  | 20% | SEP | SEP$^{(1)}$ | >25° C. | >25° C. | N.T.$^{(6)}$ | HAZY | SEP$^{(1)}$ | >25° C. | >25° C. | N.T.$^{(6)}$ |
| 13. | Diisodecyl Adipate | 10% | HAZY | SEP$^{(1)}$ | >25° C. | >70° C. | N.T.$^{(6)}$ | YES | SEP$^{(1)}$ | >70° C. | >70° C. | N.T.$^{(6)}$ |
|  |  | 20% | YES | YES$^{(1)}$ | — | 20° C. | −10° C. | HAZY | SL. HAZE$^{(1)}$ | >25° C. | >70° C. | N.T.$^{(6)}$ |
|  |  | 30% | HAZY | SEP$^{(1)}$ | >70° C. | — | 0° C. | HAZY | SEP$^{(1)}$ | >25° C. | >70° C. | N.T.$^{(6)}$ |
| 14. | Butyl Stearate | 10% | SEP | —$^{(1)}$ | >70° C. | — | 0° C. | HAZY | SEP$^{(1)}$ | >25° C. | >70° C. | N.T.$^{(6)}$ |
|  |  | 20% | SEP | —$^{(1)}$ | >70° C. | 0° C. | 0° C. | HAZY | SEP$^{(1)}$ | >25° C. | >70° C. | N.T.$^{(6)}$ |
|  |  | 30% | SEP | —$^{(1)}$ | >70° C. | 20° C. | 0° C. | HAZY | SEP$^{(1)}$ | >25° C. | >70° C. | N.T.$^{(6)}$ |
| 15. | Dimethyl Phthalate | 10% | YES | YES$^{(1)}$ | — | −5° C. | 0° C. | YES | YES$^{(1)}$ | — | 20° C. | −5° C. |
|  |  | 20% | YES | YES$^{(1)}$ | — | −5° C. | 0° C. | YES | YES$^{(1)}$ | — | 15° C. | −10° C. |
|  |  | 30% | YES | SEP$^{(1)}$ | >25° C. | −10° C. | −5° C. | YES | YES$^{(1)}$ | — | 20° C. | N.T.$^{(6)}$ |
| 16. | Diethyl Phthalate | 10% | HAZY | YES$^{(1)}$ | — | <−10° C. | −10° C. | YES | YES$^{(1,4)}$ | — | 5° C. | −5° C. |
|  |  | 20% | YES | YES$^{(1)}$ | — | <−10° C. | −5° C. | YES | YES$^{(1,4)}$ | — | −10° C. | −10° C. |
|  |  | 30% | YES | YES$^{(1)}$ | — | <−10° C. | <−10° C. | YES | YES$^{(1,4)}$ | — | <−10° C. | 0° C. |

TABLE I-continued

| | | | COMPATIBILITY | | | | IN MONDUR PF* | | |
|---|---|---|---|---|---|---|---|---|---|
| 17. | Dioctyl Phthalate (DOP) | 10% 20% 30% | YES YES YES | YES(1) YES(1) SL. HAZE(1) | —  20° C. — | —5° C. —<10° C. — | YES(1,3) YES(1,3) SEP(1,3) | — — 25° C. | — 5° C. 5° C. — | —5° C. <—10° C. N.T.(6) |
| 18. | MONDUR E-501* | none | — | YES | — | 4° C.(7) | YES | — | 4° C.(8) | 4° C.(8) |
| 19. | ISONATE 240* | | | | | | | | | |

| NO. | FLOW MODIFIER | CONCENTRATION BY WEIGHT | @ 70° C. | @ 25° C. | SEPARATION POINT | SEPARATION POINT | CLOUD POINT | FREEZE POINT |
|---|---|---|---|---|---|---|---|---|
| 20. | Bis(2-Ethylhexyl Terephthalate | 10% 20% 30% | YES YES YES | YES(1) YES(1) YES(1) | — — — | | N.N.(5) N.N.(5) — | 0° C. —10° C. <—10° C. |
| 21. | Diisodecyl Phthalate | 10% 20% 30% | YES YES YES | YES(1) YES(1) YES(1) | — — — | | N.N.(5) N.N.(5) N.N.(5) | 0° C. —10° C. <—10° C. |
| 22. | Dibutyl Phthalate | 10% 20% 30% | YES YES YES | YES(1) YES(1) YES(1) | — — — | | N.N.(5) N.N.(5) N.N.(5) | 0° C. —10° C. <—10° C. |
| 23. | Trioctyl Trimellitate | 10% 20% 30% | YES YES YES | YES(1) YES(1) YES(1) | — — — | | 10° C. 15° C. N.N.(5) | 0° C. —10° C. <—10° C. |
| 24. | Diisooctyl Phthalate | 10% 20% 30% | YES YES YES | YES(1) YES(1) YES(1) | — — — | | N.N.(5) N.N.(5) N.N.(5) | 0° C. —10° C. <—10° C. |
| 25. | Dioctyl Sebacate | 10% 20% 30% | YES YES YES | YES(1) YES(1) YES(1) | — — 5° C. | | 10° C. 10° C. 15° C. | 0° C. —10° C. <—10° C. |
| 26. | Ditridecyl Phthalate | 10% 20% 30% | YES YES YES | YES(1) YES(1) YES(1,3) | — — — | | N.N.(5) N.N.(5) 10° C. | 0° C. —10° C. <—10° C. |
| 27. | Diallyl Phthalate | 10% 20% 30% | YES YES YES | YES(1) YES(1) YES(1) | — — 25° C. | | N.N.(5) N.N.(5) — | 0° C. —10° C. N.T.(6) |
| 28. | Diisobutyl Adipate | 10% 20% 30% | YES YES YES | SEP(1) YES(1) YES(1) | — — — | | N.N.(5) N.N.(5) 5° C. | 0° C. —10° C. <—10° C. |
| 29. | Dibutyl Sebacate | 10% 20% 30% | YES YES YES | HAZY(1) YES(1) YES(1) | — 5° C. 10° C. | | 5° C. >25° C. 20° C. | —10° C. N.T.(6) 0° C. |
| 30. | Dioctyl Azelate | 10% 20% 30% | YES YES YES | YES(1) YES(1) YES(1) | — 10° C. 10° C. | | 10° C. 20° C. 5° C. | —10° C. N.T.(6) 0° C. |
| 31. | n-Octyl-n-Decyl Adipate | 10% 20% 30% | YES YES YES | YES(1) YES(1) YES(1) | — — — | | 5° C. N.N.(5) 20° C. | <—10° C. 5° C. 10° C. |
| 32. | Diisodecyl Adipate | 10% 20% 30% | YES YES YES | YES(1) YES(1) YES(1) | — — — | | N.N.(5) N.N.(5) N.N.(5) | 10° C. 0° C. —10° C. |
| 33. | Butyl Stearate | 10% | YES | YES(1) | — | | N.N.(5) | —10° C. |
| 34. | Dimethyl Phthalate | 10% 20% | YES YES | YES(1) YES(1) | — — | | N.N.(5) N.N.(5) | 0° C. —10° C. |

TABLE I-continued

| | | | | | | |
|---|---|---|---|---|---|---|
| 35. | Diethyl Phthalate | 30% | YES | YES[1] | — | −10° C. | −10° C. |
| | | 10% | YES | YES[1] | — | 5° C. | 0° C. |
| | | 20% | YES | YES[1] | — | N.N.[5] | −10° C. |
| 36. | Dioctyl Phthalate (DOP) | 30% | YES | YES[1,3] | — | N.N.[5] | <−10° C. |
| | | 10% | YES | YES[1,3] | — | N.N.[5] | 0° C. |
| | | 20% | YES | YES[1] | — | −5° C. | −10° C. |
| 37. | MONDUR PF* | 30% | YES | YES | — | 0° C. | <−10° C. |
| | | | | | | N.N.[5] | 10° C.[9] |

FOOTNOTES:
[1]Test tube heated to 70° C. for 20–30 minutes, the contents agitated by vigorous shaking, and then allowed to cool to 25° C. and maintained thereat for 4–6 hours. Compatible mixtures were further cooled as stated previously.
[2]Test tube was reheated to 80° C., contents were reagitated and held at 80° C. for 3 hours, then allowed to cool to 22° C. and maintained thereat for at least 16 hours.
[3]Test tube was reheated to 80° C., contents were reagitated and held at 80° C. for 1 hour, then allowed to cool to 22° C. and maintained thereat for 4–6 hours.
[4]Test tube was reheated to 80° C., contents were reagitated and held at 80° C. for 16 hours, then allowed to cool to 22° C. and maintained held for at least 16 hours.
[5]None noticed.
[6]Not tested.
[7]After 16 hours at 4° C. crystal formation was observed. After one week approximately one-half of the control is solid.
[8]After 16 hours at 4° C. control is a solid mass indicating that crystal formation occurs appreciably above 4° C.
[9]After 16 hours about half solid mass.
*See Trade Name Designation Table supra.
Abbreviations:
"Sl" represents Slight
"Sep" represents Separates

What is claimed is:

1. A stable, compatible liquid mixture which does not phase separate when stored for at least 100 hours at temperatures substantially below normal room temperature consisting essentially of:
   (a) an isocyanato-containing prepolymer obtained from the reactin of (1) a diphenylmethane diisocyanate and (ii) a polyol of the group consisting of linear or slightly branched polyesterpolyols having hydroxyl equivalent weights of from about 400 to about 2250 and linear or slightly branched polyetherpolyols having hydroxyl equivalents of from about 60 to about 2250, said polyol having an average hydroxyl functionality of from 2 to about 3, said diisocyanate and said polyol being used in such quantities so as to provide at least about 2.5 NCO equivalents per OH equivalent; and
   (b) from about 3 to about 35 parts by weight, per 100 parts by weight of said prepolymer, of a non-hydroxyl flow modifier, said flow modifier having the following characteristics: (i) a boiling point above about 150° C., (ii) normally liquid at 20° C. or relatively low melting solid which forms a compatible liquid mixture with said prepolymer, (iii) an average molecular weight of from 100 to approximately 1000, and (iv) consisting essentially of carbon and hydrogen atoms in the form of monovalent or polyvalent hydrocarbon groups or mixtures of such groups, and oxygen in the form of 1 to 3 ester

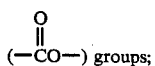
$(-\overset{\mathrm{O}}{\underset{\|}{\mathrm{C}}}\mathrm{O}-)$ groups;

said flow modifier being selected from the group consisting of compounds of Formula I:

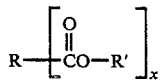
$$R\!\!-\!\!\left[\overset{\mathrm{O}}{\underset{\|}{\mathrm{C}}}\mathrm{O}\!-\!\mathrm{R}'\right]_x \quad \mathrm{I}$$

wherein each R', individually, represents a $C_1$-$C_{18}$alkyl, a $C_2$-$C_{12}$alkenyl, a $C_5$-$C_7$cycloalkyl, or a phenyl group; wherein x is an integer having a value of 1 to 3; and wherein R represents a hydrocarbon group having up to 17 carbon atoms and being selected from group of an alkyl, an alkylene, a $C_5$-$C_7$cycloalkyl, a $C_5$-$C_7$cycloalkylene, a phenyl, or a phenylene group and compounds of Formula II:

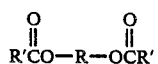
$$\overset{\mathrm{O}}{\underset{\|}{\mathrm{R}'\mathrm{C}}}\mathrm{O}\!-\!\mathrm{R}\!-\!\mathrm{O}\overset{\mathrm{O}}{\underset{\|}{\mathrm{C}}}\mathrm{R}' \quad \mathrm{II}$$

wherein R', individually, has the meanings asigned to R' in Formula I above; and wherein R is a hydrocarbon group having up to 17 carbon atoms selected from the group of an alkylene, a $C_5$-$C_7$cycloalkylene, or a phenylene group.

2. The compatible liquid mixture of claim 1 wherein
   (a) said polyesterpolyols have hydroxyl equivalent weights of from about 500 to about 2000 and said polyetherpolyols have hydroxyl equivalent weights of from about 200 to about 2000;
   (b) said flow modifier is a Formula I compound having a molecular weight of from about 135 to about 800; and
   (c) said liquid mixture contains from about 5 to about 30 parts of said flow modifier per 100 parts of said prepolymer.

3. The compatible liquid mixture of claim 2 wherein:
   (a) said isocyanato-containing prepolymer is obtained from the reaction of (i) a diphenylmethane diisocyanate and (ii) a linear or slightly branched polyol which has a hydroxyl equivalent weight of from about 500 to about 1500 and an average hydroxyl functionality of from about 2 to about 2.5; said diisocyanate and said polyol being used in such quantities so as to provide from about 2.7 to about 24 NCO equivalents per OH equivalent, and
   (b) said liquid mixture contains from about 7 parts to about 25 parts of said flow modifier per 100 parts of said prepolymer.

4. The compatible liquid mixture of claim 2 wherein said prepolymer is obtained from the reaction of (i) a diphenylmethane diisocyanate containing at least 75 weight percent of the 4,4'-isomer and (ii) a polyol.

5. The compatible liquid mixture of claim 3 wherein said prepolymer is obtained from the reaction of (i) a diphenylmethane diisocyanate containing at least 75 weight percent of the 4,4'-isomer and (ii) a polyol.

6. The compatible liquid mixture of claim 4 which is stable and liquid at a temperature of about +5° C. and wherein:
   (a) said flow modifier is a di($C_1$-$C_{12}$alkyl) $C_4$-$C_{10}$alkanedioate, and
   (b) the quantities of said diisocyanate and said polyol being sufficient to provide from about 3.7 to about 12 NCO equivalents per OH equivalent.

7. The compatible liquid mixture of claim 6 wherein said flow modifier is dibutyl adipate.

8. The compatible liquid mixture of claim 6 wherein said flow modifier is dibutyl sebacate.

9. The compatible liquid mixture of claim 4 which is stable and liquid at a temperature of about 30 5° C. and wherein:
   (a) said flow modifier is di($C_1$-$C_{12}$alkyl) phthalate, and
   (b) the quantities of said diisocyanate and said polyol being sufficient to provide from about 3.7 to about 12 NCO equivalents per OH equivalent.

10. The compatible liquid mixture of claim 9 wherein said flow modifier is dimethyl phthalate.

11. The compatible liquid mixture of claim 9 wherein said flow modifier is dibutyl phthalate.

12. The compatible liquid mixture of claim 9 wherein said flow modifier is diethyl phthalate.

13. The compatible liquid mixture of claim 1 wherein
    (a) said polyesterpolyols have hydroxyl equivalent weights of from about 500 to about 2000 and said polyetherpolyols have hydroxyl equivalent weights of from about 200 to about 2000;
    (b) said flow modifier is a Formula II compound having a molecular weight of from about 135 to about 800; and
    (c) said liquid mixture contains from about 5 to about 30 parts of said flow modifier per 100 parts of said prepolymer.

14. The compatible liquid mixture of claim 13 wherein:
    (a) said isocyanato-containing prepolymer is obtained from the reaction of (a) a diphenylmethane diisocyanate and (ii) a linear or slightly branched polyol which has a hydroxyl equivalent weight of from about 500 to about 1500 and an average hydroxyl functionality of from about 2 to about 2.5; said diisocyanate and said polyol being used in such quantities so as to provide from about 2.7 to about 24 NCO equivalents per OH equivalent, and (b) said liquid mixture contains from about 7 parts to about 25 parts of said flow modifier per 100 parts of said prepolymer.

15. The compatible liquid mixture of claim 13 wherein said prepolymer is obtained from the reaction of (i) a diphenylmethane diisocyanate containing at least 75 weight percent of the 4,4′-isomer and (ii) a polyol.

16. The compatible liquid mixture of claim 15 which is stable and liquid at a temperature of about $+5°$ C. and wherein said flow modifier is a liquid diester of $C_2$–$C_{17}$alkanoic acid and $C_2$–$C_8$alkanediol.

17. The compatible liquid mixture of claim 15 which is stable and liquid at a temperature of about $+5°$ C. and wherein said flow modifier is a liquid diester of butyric acid and $C_2$–$C_8$-alkanediol.

18. The compatible liquid mixture of claim 15 which is stable and liquid at a temperature of about $+5°$ C. and wherein said flow modifier is a liquid triester of $C_2$–$C_{17}$alkanoic acid and $C_3$–$C_6$alkanetriol.

19. The compatible liquid mixture of claim 15 which is stable and liquid at a temperature of about $+5°$ C. and wherein said flow modifier is a liquid triester of butyric acid and $C_3$–$C_6$-alkanetriol.

* * * * *